(12) United States Patent
Petersson et al.

(10) Patent No.: US 9,245,285 B2
(45) Date of Patent: Jan. 26, 2016

(54) COLLECTION CONTROLLER FOR INFLUENCING SERVICE TO A USER STATION

(75) Inventors: Justus Petersson, Stockholm (SE); Avelina Pardo-Blazquez, Madrid (ES); Victor Manuel Avila Gonzalez, Madrid (ES); Paulus Karremans, Tilburg (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1679 days.

(21) Appl. No.: 12/306,836

(22) PCT Filed: Jun. 28, 2006

(86) PCT No.: PCT/EP2006/006276
§ 371 (c)(1),
(2), (4) Date: Dec. 29, 2008

(87) PCT Pub. No.: WO2008/000287
PCT Pub. Date: Jan. 3, 2008

(65) Prior Publication Data
US 2009/0177650 A1    Jul. 9, 2009

(51) Int. Cl.
| | |
|---|---|
| *G06F 17/30* | (2006.01) |
| *G06F 21/00* | (2013.01) |
| *G06Q 30/04* | (2012.01) |
| *H04L 12/66* | (2006.01) |
| *H04M 15/00* | (2006.01) |
| *H04L 29/08* | (2006.01) |
| *H04W 4/24* | (2009.01) |

(52) U.S. Cl.
CPC .................. *G06Q 30/04* (2013.01); *H04L 12/66* (2013.01); *H04L 67/14* (2013.01); *H04L 67/306* (2013.01); *H04M 15/00* (2013.01); *H04W 4/24* (2013.01)

(58) Field of Classification Search
CPC ........................................ G06Q 30/04
USPC .................. 707/792, 802, 803, 827, 999.001, 707/999.003, 999.01, 999.101, 999.102, 707/705, 783, 784, 809; 709/229; 705/28, 705/34, 52, 53
See application file for complete search history.

(56) References Cited

U.S. PATENT DOCUMENTS

| | | | | |
|---|---|---|---|---|
| 7,797,243 | B2 * | 9/2010 | Stadelmann ......... | G06Q 20/123 705/52 |
| 8,473,570 | B2 * | 6/2013 | Barone ................ | H04L 67/306 709/217 |
| 2005/0102205 | A1 | 5/2005 | Yamamoto et al. | |
| 2005/0286540 | A1 | 12/2005 | Hurtta et al. | |
| 2006/0253596 | A1 * | 11/2006 | Barone et al. ................ | 709/229 |

FOREIGN PATENT DOCUMENTS

JP    2000-332750 A    11/2000

* cited by examiner

*Primary Examiner* — Marc Filipczyk

(57) ABSTRACT

A content provider provides a content provider and service identification to a collection controller. The collection controller retrieves content provider and service specific service provision characteristics from a user subscription database and sets these service provision characteristics as a filter in a service provision control device to be used in the provision of a service from the content provider to the user equipment. Thus, the content provider, through the retrieved content server & service related characteristics from the user subscriber database, can influence the charging and transmission policies used by service provision control device for providing the service.

15 Claims, 6 Drawing Sheets

| TYPE | CP & SERVICE ID:8759-570 | |
|---|---|---|
| SPC2 | SUBSCRIBER VALIDITY GROUP | "SILVER & ABOVE" ↔ [20...] |
| SPC2 | PAYMENT CONDITIONS | "8759" PAYS<br>"CHARGING RELATED" |
| SPC1 | QoS | "BW MAX 128 KBPS, ETC"<br>"TRANSMISSION RELATED" |
| SPC2 | VALIDITY PERIOD | "APRIL 23RD, 2006, 00.00 TO<br>MAY 11TH, 2006. 00.00" |
| SPC1 | GEOGRAPHICAL AREA | SWEDEN |

FURTHER CP&S-SPC SETS
FOR OTHER USERS

| TYPE | CP & SERVICE ID:8759-570 | | USER SUBSCRIPTION |
|---|---|---|---|
| SPC2 | SUBSCRIBER VALIDITY GROUP | "SILVER & ABOVE" ↔ [20...] | USER IDENTIFICATION UID |
| SPC2 | PAYMENT CONDITIONS | "8759" PAYS | ADDRESS |
| SPC1 | QoS | "BW MAX 128 KBPS, ETC" | NAME |
| SPC2 | VALIDITY PERIOD | "APRIL 23RD, 2006, 00.00 TO MAY 11TH, 2006. 00.00" | BASIC CHARGE TARIFF |
| SPC1 | GEOGRAPHICAL AREA | SWEDEN | QUALITY OF BASIC SERVICE SUBSCRIBED |

OTHER USER SETS

*FIG. 5*

COLLECTION CONTROLLER FOR INFLUENCING SERVICE TO A USER STATION

TECHNICAL FIELD

The present invention relates to a method, a communication system and collection controller for providing services from a content provider to one or more user stations.

A particular field of application for the present invention is within the mobile standards 3GPP (TS23.203, 3GPP2 and others) but may also applicable for the TISPAN standard, ES 282 003).

BACKGROUND

FIG. 1a and FIG. 1b show a typical scenario in the prior art for providing a service to a user station UE from an application function AF, for example from a content provider. Generally, the application function AF and the user station UE cooperate through some kind of network and they exchange a request and provision message S1, S2 when the user station UE (the user equipment) requests the provision of a service or some data from the application function AF.

As shown in FIG. 1b, of course the service provided by the application function AF, typically run by an operator of the application function, will not be provided to the user station UE, more particularly to the user of the user equipment, free of charge. Therefore, typically the application function AF cooperates with a charging system CS after it receives the request message S1. The charging system CS sends an enquiry message S4 to a subscription database UDB in order to check the provision details of the service with the subscriber data. In the simplest case one can imagine that the charging system checks with the user subscription database DB whether or not the user is actually registered for receiving the service provided by the application function AF. If a positive reply message S5 is received, then the charging system CS can monitor the provision of the service and can, on behalf of the operator of the application function AF, finally charge the user of the user equipment UE with a charging message S6 whilst the service is provided with the service provision message S2 by the application function AF.

FIG. 2 shows a more concrete implementation in the framework of the 3GPP standard including the option to take the end-user's subscription data into account when constructing filters for e.g. QoS (Quality of Service) and charging only.

In FIG. 2 the application function AF is coupled through an interface Rx with the so-called Policy and Charging Rules Function (PCRF) unit which itself is coupled through an interface Sp with the subscription profile repository SPR which contains the user subscription database UDB shown in FIG. 1b. Through another interface Gx the Policy and Charging Rule Function PCRF is coupled with a gateway GW containing a Policy and Charging Enforcement Function PCEF. The gateway GW itself is coupled to an offline charging system OFCS through an interface Gz and to an online charging system OCS through an interface Gy. One could say that the Policy and Charging Rules Function PCRF unit is a kind of collection controller for collecting end-user's subscription data and for allowing the Policy and Charging Enforcement Function PCEF unit to enforce the policies and the charging when the service is actually provided from the application function AF. In corporation with the online charging system OCS and the offline charging system OFCS the Policy and Charging Enforcement Function PCEF unit "enforces", i.e. applies the charging rules in correspondence with the subscription data retrieved from the subscription profile repository SPR. Thus, the PCED, OFCS and OCS taken together constitute a kind of charging control device.

As explained, since there is a interface Sp situated between the subscription profile repository SPR and the Policy and Charging Rules Function PCRF, the interface Sp allows the PCRF to request subscription information related to the IP-CAN transport level policies from the SPR based on a subscriber identity ID and possible IP-CAN session attributes such as IMSI, MSISDN, APN and RAT type. Furthermore, the interface Sp allows the SPR to notify the PCRF when the subscription information has been changed if the PCRF has requested such notifications.

As can be seen from FIG. 2, the 3GPP policy architecture for QoS and charging policy control allows that subscriber (user) specific subscription data influences the charging policy and the policy as to how the service is provided from the application function AF to the user equipment UE (not shown in FIG. 2). Thus, the SPR (Subscriber Policy Repository) stores subscriber related policies and data only. Examples of such data are subscription type and QoS. For example, if the agreement (see the agreement S7 in FIG. 1b) between the user and the operator of the application function AF is such that the user will be provided with a specified quality of service QoS for which he has to pay, then the PCEF enforcement unit will make sure that the service is provided with the paid for transmission quality (QoS) and that the user is charged in accordance with the charge rate applied for this user (as identified with the user identification such as IMSI, MSISDN, APN and RAT type).

In other words, the subscriber profile repository SPR, as the name indicates, is only used as a tool for subscription type and QoS data and there is no possibility that a third party, e.g. an operator of a content provider, exert any influence on the policy evaluation and the decision for new services. For example, a third party may want to offer a free service with a predetermined QoS to a selected set of users in a geographical area during a predetermined time. This may be done for service test purposes, i.e. to get an early indication whether the consumers like the service and to which price they are willing to pay for it. To put it differently, the gateway GW in the communication system, will provide the service from the application function AF to the user equipment UE (not shown in FIG. 2) in accordance with provision characteristics being charge related. However, since the provision characteristics are only user-related or user-specific there is no possibility that a third party, for example a content provider, influences the way of charging and transmission of the service—essentially because of the fact that the subscription profile repository SPR (as the name indicates) only contains subscriber-specific data.

SUMMARY

As explained above, there are several disadvantages in common communication systems, for example under the 3GPP standard, because the provision of a service from an application function AF, e.g. a content provider, to a user station UE is only governed by subscriber-specific data stored in the user subscription database UDB and thus it is not possible that a third party, e.g. a content provider, influences in any way the charging and transmission characteristics of the service to be provided.

Therefore, the object of the present invention is to provide a method, a communication system and a controller of a communication system which allow a third party to influence the provision and charging characteristics of a requested service in the communication system.

This object is solved by a method in a communication system (SYS) for providing services from a content provider (CP) to one or more user stations (UE) dependent on service provision characteristics (SPC) in a user subscription database (UDB), said service provision characteristics (SPC) comprise at least content provider & service specific service provision characteristics (CP&S-SPC), comprising the following steps:

a) sending (S2), from a user station (UE), a service request message (SRM) to said content provider (CP);
b) retrieving (S6), by a retrieving device (RETR) of a collection controller (SPC-CNTL), from said user database (UDB) content provider & service specific service provision characteristics (CP&S-SPC) dependent on a content provider & service identification (CP&S-ID; 8759-570) provided (S3) by said content provider (CP) in response to said service request message (SRM);
c) setting (S7), by a setting device (SET) of said collection controller (SPC-CNTL), a service provision filter on the basis of said retrieved content provider & service specific service provision characteristics (CP&S-SPC) and transmitting said service provision filter to a service provision control device (SPCD) of said communication system (SYS); and
d) providing (S8) said requested service from said content provider (CP) to said user station (UE) through said service provision control device (SPCD) in accordance with said content provider & service specific service provision characteristics (CP&S-SPC) set in said service provision filter.

Thus, the invention provides a new and attractive way to allow a third party in introduce, test, promote and offer new services to a user station in a dynamic fashion.

Advantageously, step a) is preceded by a step a0) in which a service/content provider (CP, CP') sets said content provider & service specific characteristics in said user subscription database (UDB).

Advantageously, said service provision characteristics (SPC) comprise first service provision characteristics (SPC1) indicating transmission related provision characteristics and second service provision characteristics (SPC2) indicating charging related provision characteristics.

Advantageously, said user subscription database (UDB) further stores user specific subscription data (USD) for each user, wherein
said step b) further comprises the retrieving of user specific subscription data (USD) from said user database (UDB) dependent on a user identification (UID);
said step c) further comprises the setting of said user specific subscription data (USD) in said service provision filter and the transmitting of said service provision filter to said service provision control device (SPCD) of said communication system (SYS); and
said step d) further comprises the providing of said requested service from said content provider (CP) to said user station (UE) through said service provision control device (SPCD) in accordance with said set content provider & service specific service provision characteristics (CP&S-SPC) as well as said user specific subscription data (USD) in said service provision filter.

Advantageously, said service provision control device (SPCD) is part of a gateway device (GW), and said retrieving (S3, S4, S5, S6) step b) comprises the following steps:

sending (S3) said content provider & service identification (CP&S-ID; 8759-570) from said content provider (CP) to said service provision characteristics collection controller (SPC-CTRL);
sending (S4) a transmission characteristics request message to said gateway device (GW);
sending (S5) a transmission characteristics and charging characteristics request message from said gateway device (GW) to said service provision characteristics collection controller (SPC-CTRL);
said collection controller (SPC-CTRL) collecting (S6) from said user subscription database (USD), on the basis of said requested transmission and charging characteristics (S4, S5) and said content provider & service identification (CP&S-ID; 8759-570), first and second service provision characteristics (SPC1; SPC2) matching those of said requested transmission characteristics and said charging characteristics; and
said setting (S7) step c) comprises the setting of the collected (S6) first service provision characteristics (SPCS and the collected (S6) second service provision characteristics (SPC2) as a transmission filter and as a charging filter and the transmission of said transmission filter to a transmission control device (TCD) and said charging filter to a charging control device (CCD) of said gateway device (GW) of said communication system (SYS); and
said providing step (S8) comprises the providing (S8) of said requested service from said content provider (CP) to said user station (UE) through said gateway device (GW) in accordance with said first and second service provision characteristics (SPC1; SPC2) set in said transmission filter and charging filter.

Advantageously, said communication system (SYS) operates in accordance with the PCC-3GPP Standard, wherein:
said user subscription database (UDB) is constituted by a subscription Profile Repository (SPR);
said collection controller (SPC-CNTL) including said retrieving device (RETR) and said setting device (SET) is constituted by a Policy and Charging Rules Function (PCRF) unit;
said gateway unit (GW) is constituted by a GPRS General Service Node (GGSN); and
said transmission control device (TCD) and said charging control device (CCD) are constituted by a Policy and Charging Enforcement (PCEF) unit in said gateway unit (GW).

Advantageously, said Policy and Charging Enforcement (PCEF) unit cooperates with a Online Charging System (OCS) and an Offline Charging System (OFCS) through a respective interface (Gy, Gz).

Advantageously, said user identification (UID) comprises one or more of the group consisting of: IMSI, MSISDN, APN and RAT type.

Advantageously, said first service provision characteristics (SPC1) indicating transmission related provision characteristics include a Quality of Service (QoS) parameter and said second service provision characteristics (SPC2) indicating charging related provision characteristics include a Subscriber Validity Group, Payment Conditions, Validity Period and Geographical Area.

Advantageously, whenever a third party changes (S1) a0) said content provider & service specific characteristics in said user subscription database (UDB), a content provider & service specific characteristics update message (UP) is provided to said collection controller (SPC-CNTL).

The object is also solved by a controller (SPC-CNTL) of a communication system (SYS) which includes a user subscription database (UDB) in which are stored at least service provision characteristics (SPC), said service provision characteristics (SPC) comprise at least content provider & service specific service provision characteristics (CP&S-SPC), one or more user stations (UE) and a service provision control device (SPC-CD) for providing services from said content provider (CP) to said one or more user stations (UE) dependent on said service provision characteristics (SPC), comprising:

a) a retrieving device (S6; RETR) adapted to retrieve from said user database (UDB) content provider & service specific service provision characteristics (CP&S-SPC) dependent on a content provider & service identification (CP&S-ID; 8759-570) provided by said content provider (CP); and
b) a setting device (SET) adapted to set a service provision filter on the basis of said content provider & service specific service provision characteristics (CP&S-SPC); and
c) said setting device (SET) being also adapted to transmit said set service provision filter to said service provision control device (SPCD) which controls the service provision from said content provider (CP) to said user station (UE) dependent on said service provision filter.

Advantageously, said content provider & service specific service provision characteristics (CP&S-SPC) are charging related service provision characteristics (CP&S-SPC) and said service provision filter is a charging filter.

Advantageously, said retrieving device (RETR) is adapted to retrieve or to receive (S3) said content provider & service identification (CP&S-ID; 8759-570) from said content provider (CP).

Advantageously, said retrieving device (RETR) is adapted to retrieve said content provider & service identification (CP&S-ID; 8759-570) from said content provider (CP) through an Rx interface.

Advantageously, said service provision characteristics (SPC) comprise first service provision characteristics (SPC1) indicating transmission related provision characteristics and second service provision characteristics (SPC2) indicating charging related provision characteristics.

Advantageously, said user subscription database (UDB) further stores user specific subscription data (USD) for each user, wherein said retrieving device (RETR) is further adapted for retrieving of user specific subscription data (USD) from said user subscription database (UDB) dependent on a user identification (UID);
said setting device (SD) is further adapted to set said user specific subscription data (USD) in said service provision filter; and
wherein said service provision control device (SPCD) is adapted to provide said requested service from said content provider (CP) to said user station (UE) through said service provision control device (SPCD) in accordance with said set content provider & service specific service provision characteristics (CP&S-SPC) as well as said user specific subscription data (USD) in said set and transmitted service provision filter.

Advantageously, said service provision control device (SPCD) is part of a gateway device (GW) wherein said user station (UE), said collection controller (SPC-CTRL), said setting device (SET) and said service provision control device (SPCD) execute the following procedure:

said content provider (CP) sending (S3) said content provider & service identification (CP&S-ID; 8759-570) to said service provision characteristics collection controller (SPC-CTRL);

said user station (UE) sending (S4) a transmission characteristics request message to said gateway device (GW);

said gateway device (GW) sending (S5) a transmission characteristics and charging characteristics request message to said service provision characteristics collection controller (SPC-CTRL);

said collection controller (SPC-CTRL) collecting (S6, S6') from said user subscription database (USD), on the basis of said requested transmission and charging characteristics (S4, S5) and said content provider & service identification (CP&S-ID; 8759-570), first and second service provision characteristics (SPC1; SPC2) matching those of said requested transmission characteristics and said charging characteristics; and said setting device (SET) setting (S7) as a transmission filter (RETR) the collected (S6) first service provision characteristics (SPCS) and as a charging filter said collected (S6) second service provision characteristics (SPC2) and transmitting said transmission filter to a transmission control device (TCD) and said charging filter as to a charging control device (CCD) of said service provision control device (SPCD) of said gateway device (GW) of said communication system (SYS); and said service provision control device (SPCD) providing (S8, S8') said requested service from said content provider (CP) to said user station (UE) through said gateway device (GW) in accordance with said set first and second service provision characteristics (SPC1; SPC2) set in said transmission and charging filters.

Advantageously, said user identification (UID) comprises one or more of the group consisting of: IMSI, MSISDN, APN and RAT type.

Advantageously, said first service provision characteristics (SPC1) indicating transmission related provision characteristics include a Quality of Service (QoS) parameter and said second service provision characteristics (SPC2) indicating charging related provision characteristics include a Subscriber Validity Group, Payment Conditions, Validity Period and Geographical Area.

The object is also solved by a communication system (SYS) which includes a user subscription database (UDB) in which are stored at least service provision characteristics (SPC), said service provision characteristics (SPC) comprise at least content provider & service specific service provision characteristics (CP&S-SPC), one or more user stations (UE), and a service provision control device (SPC-CD) for providing services from said content provider (CP) to said one or more user stations (UE) dependent on said service provision characteristics (SPC), comprising:

a) in said one or more user stations (UE), a sending device (SD) for sending (S2), from said user station (UE), a service request message (SRM) to said content provider (CP);
b) a service provision characteristics collection controller (SPC-CTRL) including a retrieving device (RETR) adapted to retrieve (S3, S4, S5, S6) from said user database (UDB) content provider & service specific service provision characteristics (CP&S-SPC) dependent on a content provider & service identification (CP&S-ID; 8759-570) provided by said content provider (CP) in response to said service request message (SRM);
c) said service provision characteristics collection controller (SPC-CTRL) also including a setting device (SET) adapted to set (S7) a service provision filter on the basis of said retrieved content provider & service specific service provision characteristics (CP&S-SPC);

said setting device (SET) being also adapted to transmit said set service provision filter to said service provision control device (SPCD); and d) said service provision control device (SPCD) providing said service from said content provider (OP) to said user station (UE) dependent on the content provider & service specific service provision characteristics (CP&S-SPC) set in said service provision filter.

Advantageously, said content provider & service specific characteristics in said user subscription database (UDB) are set by a service/content provider (CP, CP').

Advantageously, said service provision control device (SPCD) is part of a gateway device (GW) wherein said user station (UE), said collection controller (SPC-CTRL), said setting device (SET) and said service provision control device (SPCD) execute the following procedure:

said content provider (CP) sending (S3) said content provider & service identification (CP&S-ID; 8759-570) to said service provision characteristics collection controller (SPC-CTRL);

said user station (UE) sending (S4) a transmission characteristics request message to said gateway device (GW);

said gateway device (GW) sending (S5) a transmission characteristics and charging characteristics request message to said service provision characteristics collection controller (SPC-CNTL);

said collection controller (SPC-CTRL) collecting (S6) from said user subscription database (USD), on the basis of said requested transmission and charging characteristics (S4, S5) and said content provider & service identification (CP&S-ID; 8759-570), first and second service provision characteristics (SPC1; SPC2) matching those of said requested transmission characteristics and said charging characteristics; and said setting device (SET) setting (S7) the collected (S6) first service provision characteristics (SPCS) and the collected (S6) second service provision characteristics (SPC2) as a transmission filter and a charging filter and transmitting said transmission filter and charging filter to a transmission control device (TCD) and a charging control device (CCD) of said service provision control device (SPCD) of said gateway device (GW) of said communication system (SYS); and said service provision control device (SPCD) providing (S8) said requested service from said content provider (CP) to said user station (UE) through said gateway device (GW) in accordance with said set first and second service provision characteristics (SPC1; SPC2) of said transmission filter and charging filter.

Advantageously, said communication system (SYS) operates in accordance with the PCC-3GPP Standard, wherein:
said user subscription database (UDB) is constituted by a subscription Profile Repository (SPR) unit;
said collection controller (SPC-CNTL) with the setting device (SET) and the retrieving device (RETR) is constituted by a Policy and Charging Rules Function (PCRF) unit;
said gateway unit (GW) is constituted by a GPRS General Service Node (GGSN); and
said service provision control device (SPCD) with said transmission control device (TCD) and said charging control device (CCD) is constituted by a Policy and Charging Enforcement (PCEF) unit.

Advantageously, said Policy and Charging Enforcement (PCEF) unit cooperates with a Online Charging System (OCS) and an Offline Charging System (OFCS) through a respective interface (Gy, Gz).

Advantageously, a third party changes (S1) said content provider & service specific characteristics in said user subscription database (UDB), wherein said user subscription database (UDB) provides a content provider & service specific characteristics update message (UP) to said collection controller (CNTL).

The object is also solved by a content provider (CP) usable in said communication system (SYS) described above, wherein said content provider (CP) includes a setting device (CP-SET) for sending (S1) to said user subscription database (UDB) a service provision characteristics (SPC) setting message (S1).

The object is also solved by a user subscription database (UDB) usable in said communication system (SYS) described above, comprising a receiving device (REC) for receiving from a content provider (CP) a service provision characteristics (SPC) setting message (S1) with service provision characteristics to be set and for setting said service provision characteristics (SPC) in said user subscription database (UDB) on the basis of said service provision characteristics (SPC) setting message (S1).

The object is further solved by a computer readable storage medium having recorded thereon a program for carrying out one or more of the steps/functions disclosed above.

Reference numerals used above are only used for illustration and no limitation to the embodiments and examples disclosed and described hereinafter is intended.

Further advantageous embodiments and improvements are listed in the dependent claims. It should also be noted that the invention comprises further embodiments and improvements which originate from a combination of features and steps which have been separately described in the description, the claims and the drawings.

Hereinafter, the invention will be described with reference to its advantageous embodiments.

BRIEF DESCRIPTION OF THE DRAWINGS

In the drawings:

FIG. 1b shows a similar diagram as in FIG. 1a, however including a charging system CS in the request/provision scenario in FIG. 1a;

FIG. 5 shows an embodiment of the user subscription database UDB also having a subscription profile;

In the various drawings, the same or similar reference numerals describe the same or similar parts. Hereinafter, first the principle of the invention will be described with reference to FIG. 3.

DETAILED DESCRIPTION

The basic concept of the invention is to include a third party policy data and rules into a user subscriber data base and to include such policy data and rules into the accompanying policy handling, i.e. to allow service and content providers to store their policy data and rules in the user subscriber data base. Then, in the provision of the service, the service content provider's policy data and rules will be used in a service provision control device SPCD in order to influence and determine the data or service provision to the user equipment UE. Thus, third parties, for example service and content providers, will enlarge their business opportunities.

Figures 3, 4:
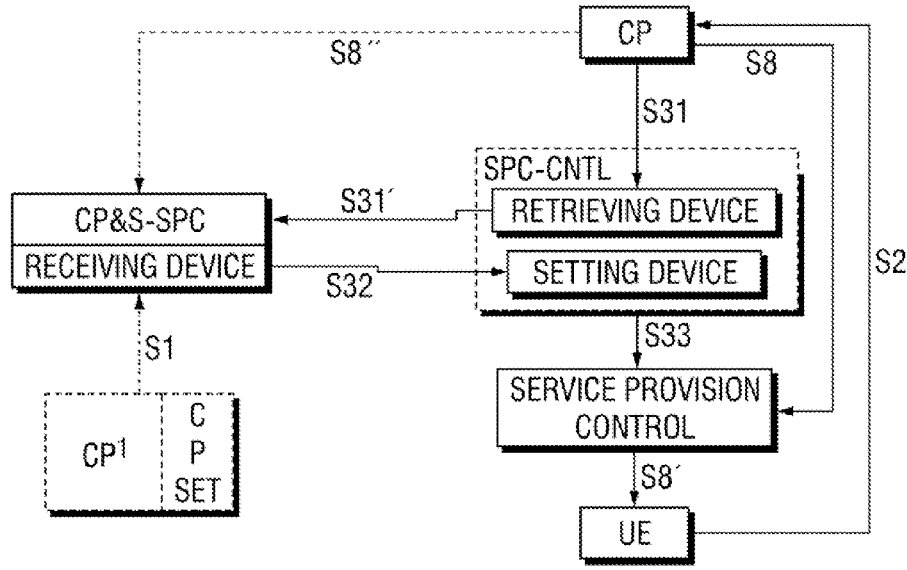
FIG. 3 shows a block diagram of SPC-CNTL controller and a communication system SYS in accordance with the invention.
FIG. 4 shows the contents of the modified user subscription database UDB shown in FIG. 3.

FIG. 3 shows a communication system SYS in accordance with the invention including a collection controller SPC-CNTL in accordance with the invention for carrying out a method for service provision including the messages S1, S2, S31, S31', S32, S33, S8' in accordance with the invention.

As shown in FIG. 3, the communication system SYS is to provide services from a content provider CP to one or more user stations UE dependent on service provision characteristics SPC in a user subscription data base UDB. The service provision characteristics SPC comprise at least content provider & service specific service provision characteristics CP&S-SPC. As part of the communication system SYS, a collection controller SPC-CNTL is provided, which includes a retrieving device RETR and a setting device SET.

Figure 1A:
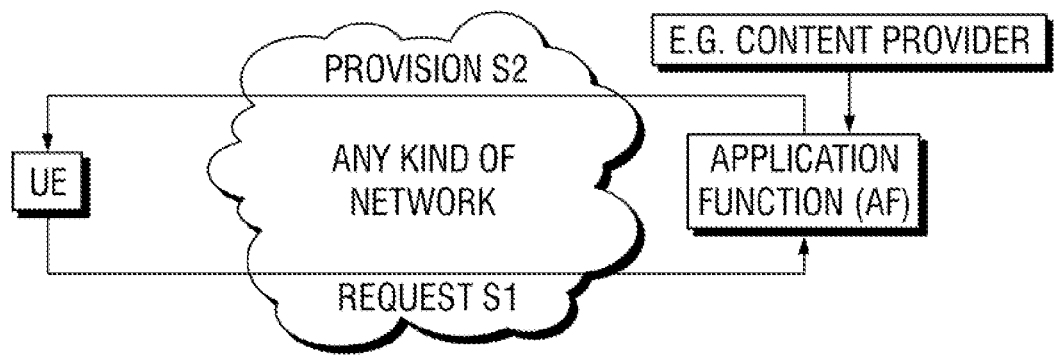
FIG. 1a shows a typical request/provision scenario between a user equipment UE and an application function AF in accordance with the prior art.
Figure 1B:
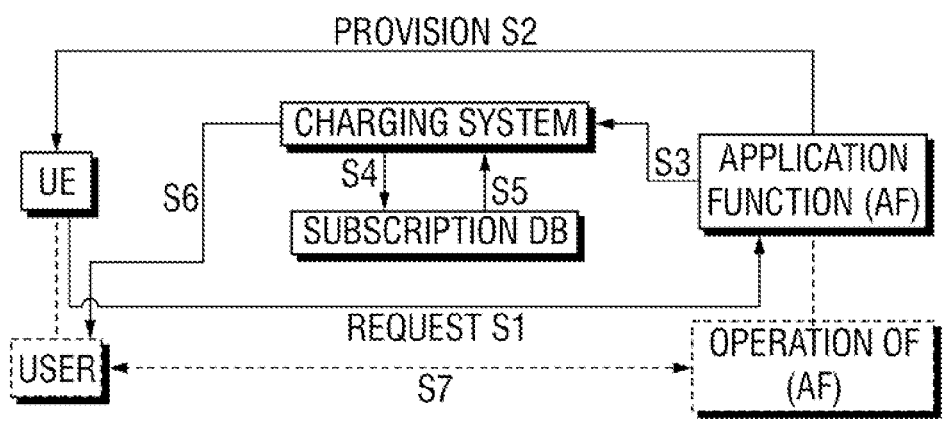

In a user subscription database UDB, similar to the one shown in FIG. 1b, at least service provision characteristics SPC are stored. The service provision characteristics SPC comprise at least content provider & service specific service provision characteristics CP&S-SPC, as indicated in the user subscription data base UDB shown in FIG. 3. Thus, by contrast to merely storing user-specific subscription data USD for each user (this is the case in FIG. 1a, and 1b and FIG. 2, the subscriber database UDB stores service provision characteristics relating to the content provider & the service. That is, in contrast to FIG. 2 in which only subscriber-related subscription data can be read out from the subscriber user database UDB, the user database UDB in accordance with FIG. 3 stores service provision characteristics which are set by the content provider and relate to any kind of characteristics of the actual content provider and/or the service itself. Since the CP&S-SPCs are not normally provided in a user subscription data base UDB but are set by a content provider CP, CP', for example with a setting step S1 shown in FIG. 3 preceding the service provision sequence of the service, one can say that the CP&S-SPCs are those service provision characteristics which are set by the third party or content provider CP, CP'.

Furthermore, as indicated already in FIG. 3, it is not necessarily the content provider CP providing the service which sets the CP&S-SPC but any other third party or content provider CP' may set such CP&S-SPC characteristics.

An example of the user subscription database UDB is shown in FIG. 4. As shown in FIG. 4, the service provision characteristics CP&S-SPC comprise first service provision characteristics SPC1 indicating the transmission related provision characteristics and a second service provision characteristics SPC2 indicating charging related provision characteristics. The first service provision characteristics SFC1 may include a quality of service (QoS) parameter and the second service provision characteristics SPC2 may include a subscriber validity group, payment conditions, validity period and geographical area. For each of the parameters, the right hand side also lists a corresponding entry, for example, regarding the subscriber validity group: "silver+above", regarding the payment conditions: "8759" pays", regarding the quality of service QoS: "and with max 128 kpps etc.", and the validity period: "Apr. 23, 2006, 00.00 to May 11, 2006, 00.00" and for geographical area: "Sweden".

All the service provision characteristics in FIG. 4 are related to the actual content provider & the service to be provided. They may or may not be associated with a certain user (subscriber) or not. That is, entries like the one in FIG. 4 can also be provided on a user specific basis and the collection controller SPC-CNTL, as described below, may also implement them for the service provision on a user-related basis. However, since all the service provision characteristics in FIG. 4 are associated with the content provider & the service to be provided, they are intrinsically different to user specific subscription data normally stored in the user data base UDB. For example, as already mentioned above with reference to FIG. 2, of course in the original subscription process the user and the operator of the application function AF may agree—through contract or agreement—on a certain bandwidth (quality of service; QoS) and a certain charging rate. When the service is provided in the FIG. 2 or FIG. 1a, of course this user-related quality of service QoS or user-related charging rate is implemented and used in the gateway GW when a service is provided. However, intrinsically such service provision characteristics are user-specific rather than content provider & service specific.

Thus, the extension to the prior art subscription database UDB in accordance with the invention allows a content provider, e.g. a media company, to lodge a free trial service to some of its customers. For example, the media company would store media company-specific service provision characteristics in the user subscription database UDB to realize that it is a free service. It may offer free mobile TV service for a week or two. During this time it will itself pay for the usage of the operator's resources in accordance with the established service level agreement (SLA).

For being able to use the content server & service-related characteristics CP&S-SPC in the actual service provision procedure, the collection controller SPC-CNTL includes a retrieving device RETR adapted to retrieve from said user database UDB the content provider & service specific service provision characteristics CP&S-SPC dependent on a content provider & service identification CP&S-ID received from the content provider CP. The CP&S-ID may be actively retrieved from said content provider CP by said retrieving device RETR or may simply be sent by said content provider CP to said retrieving device RETR in response to having received the service request message S1. Having received the service provision request from the user equipment UE in step S2, the content provider CP knows about the service to be provided and it further knows its own content provider identification. It may also know about the user and may provide to the collection controller SPC-CNTL also a user identification UID, as indicated in FIG. 3.

Thus, in step S31 in FIG. 3, the collection controller SPC-CNTL receives this content provider & service identification CP&S-ID, for example 8759-570 as indicated in FIG. 4, from the content provider CP. For a PCC-3GPP implementation, this may be done over the Rx interface. A setting device SET is provided in the collection controller SPC-CNTL for setting the retrieved content provider & service specific service provision characteristics CP&S-SPC as a service provision filter and for transmitting, in step S33, the so set service provision filter to the service provision control device in which it is used during the provision of the service in steps S8, S8'. As indicated with steps S31', S32, the retrieving device sends the content provider & service identification CP&S-ID to the subscriber data base UDB and in return the content provider & service specific service provision characteristics CP&S-SPC are provided to the setting device in step S32.

It is also possible, as indicated with step S8", that the content provider CP directly provides the identification CP&S-ID to the user data base UDB for it to provide the corresponding characteristics CP&S-SPC in the provision method S32 to the collection controller SPC-CNTL.

After the retrieving device RETR has retrieved, on the basis of the received identification CP&S ID, the CP&S-SPCs and after the setting device SET has set the CP&S-SPC in the service provision control device SPCD as a service provision filter, the service provision control device SPCD provides the requested service from said content provider CP to said user station UE in accordance with the content provider & service specific service provision characteristics CP&S-SPC set as a filter in the SPCD device, in step S8, S8'. In this manner, service provision characteristics in the subscriber database UDB which have been set previously by a content provider CP, CP' or a third party, are incorporated in service provision control device SPCD which subsequently provides the service to the user equipment UE in accordance with the newly set service provision filter (the set service provision characteristics).

Thus, if the user at a user station UE requests the provision of a service with a service request message S2 to said content provider CP, the provided service will arrive in step S8' in the user equipment UE in accordance with the service provision characteristics retrieved from the subscriber user database UDB and set as a filter in the service provision control device SPCD. As explained above, depending on the type of parameters to be set, any third party or the third party content provider CP' can set CP&S-SPC in the user subscription database with a setting message S1. However, preferably, it is the content provider CP which is also to provide the service in step S8'.

Thus, on the assumption that operator and servers/content providers have an established relation in place (for example a service level agreement, SLA) (and e.g. the same protocol semantics as specified in 3GPP-PCC are used for the case of 3GPP implementation), only new context data, policy data, policy rules and enforcement outputs (e.g. charging & QoS filter setting in said service provision control device SPCD) are required to be implemented. Note that this implies that new attributes over the respective interfaces are foreseen, e.g. over the Rx, Sp and Gx interfaces for the case of a 3GPP implementation as described with mote detail below in the implementations of FIGS. 7 and 8.

In the provisioning phase (step S1) preceding the actual "retrieving/setting phase", service/content providers (i.e. a third party) can provision, in accordance with the invention, within given frames policy data and rules into the user database (related to a specific service it is to offer/test to some of its subscribers). In the run-time phase (the actual transmission of the service in step S8, S8'), the service provision control device SPCD is capable of evaluating context data with the newly stored and set policy rules and policy data (the newly set filter in the service provision control device SPCD) found in the user subscription database UDB and of making decisions accordingly. The application function AF may include new context data needed for policy evaluation, decision and enforcement.

Thus, after a preferred provision phase S1 and a retrieving/setting and transmission phase in step S31, S31', S32, S33 the service data during the provision of the service in step S8, S8' is "filtered" in accordance with the newly set transmission characteristics and charging characteristics of the service provision filter in said service provision control device SPCD. Thus, this type of procedure allows service and content providers to store their policy data and rules into the use of subscription database and the provision of the service in step S8, S8' will be in accordance with the newly set characteristics.

Furthermore, the application function AF (content provider CP) itself may include new context data needed for policy evaluation decision and enforcement. Thus, the third party provider obtains a new and attractive way to introduce, test promote and offer new services in a dynamic fashion.

Whilst FIG. 3 only shows the setting (S1) of content provider & service specific service provision characteristics CP&S-SPC, the retrieving/setting and transmission procedure (S31, S31', S32, S33) by said collection controller, and the provision of the actual service in accordance with the characteristics CP&S-SPC by the service provision control device SPCD, it should be understood that a further influence or filtering may be done on the basis of also the user-specific subscription data USD stored traditionally in the user subscription database UDB.

The complete database in accordance with this embodiment is shown in FIG. 5 and corresponds to the use of subscription data base UDB in FIG. 3 but with the addition of user subscription data USD. In this case, not only the CP&S-SPC characteristics are retrieved and set/transmitted as a filter by the retrieving device RETR and the setting device SET but also the user specific subscription data USD. Thus, the requested service from the content provider CP to the user station UE is provided through the filter of the service provision control device SPCD in accordance with the set content provider & service specific service provision characteristics CP&S-SPC as well as said user specific subscription data USD. As shown in FIG. 5, in this manner, characteristics set by the content provider CP as well user-specific subscription data can be used in combination to influence the service provision in step S8, S8' in FIG. 3. As will be explained below, regarding another embodiment of the invention in FIG. 6, the setting device (SET) can also separately set and transmit a transmission filter and a charging filter.

The central device in FIG. 3 which really allows the external content provider to influence the data provision is the SPC-CNTL controller because its function is to collect, set, filter and transmit a new filter with the retrieved characteristics to the SPCD control device on the basis of the provided CP&S-ID. With the newly set filter the SPCD device can provide and filter the service to the user equipment. For example, the SPCD device can then apply a certain QoS and apply certain charging schemes relating to the content provider & the service.

The new filter can be imagined as having specific characteristics relating to the set CP&S-SPCs. If for example the service is then provided by the content provider CP, the filter will recognize that it is the very service for which e.g. charging should be made to "8759" and thus not the end user of the user equipment UE will be charged but the content provider "8759". The same holds true for the other filter characteristics. If e.g. a certain bandwidth should be used (see SPC1 in FIG. 4), then the filter will enforce this bandwidth but will on the other hand charge the "8759", content provider. Thus, "filtering" should be understood in such a sense that the filter "applies the one or more set content provider & service service provision characteristics CP&S-SPCs to the service as provided by the content provider CP.

Figure 6:
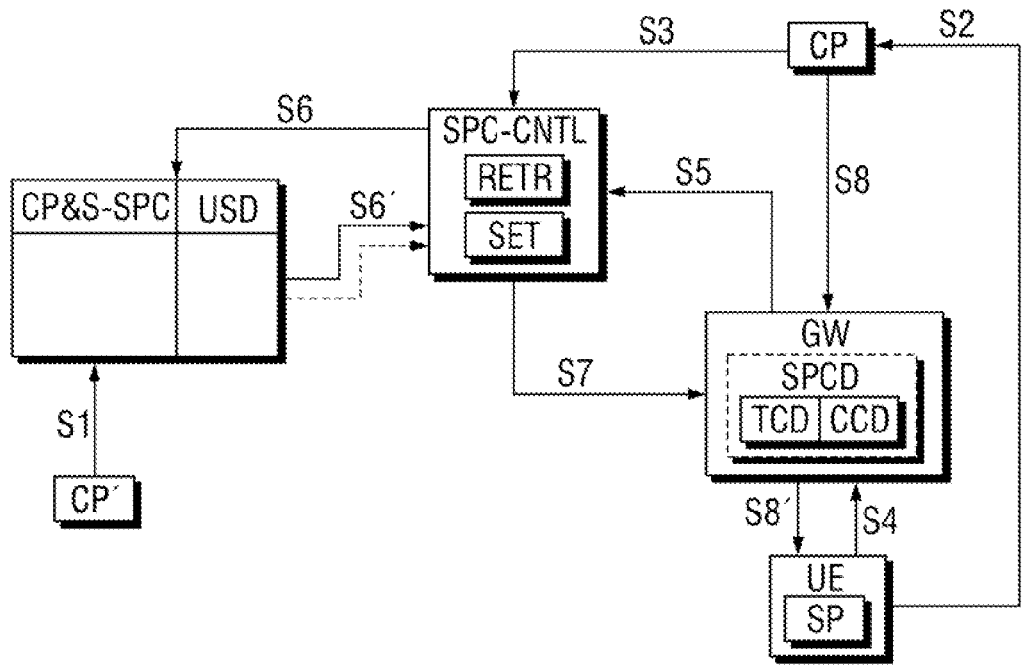
FIG. 6 shows a more detailed embodiment of the collection controller SPC-CNTL with the retrieving device RETR and the setting device SET, the subscription user database UDB and the user station UE shown in FIG. 3.

FIG. 6 shows a more concrete embodiment of the service provision control device SPCD, the user database UDB and the user equipment UE in accordance with a first embodiment of the present invention.

As in FIG. 3, the service provision characteristics collection controller SPC-CTRL includes the retrieving device RETR and the setting device SET. As before, the task of the collection controller SPC-CTRL is to retrieve, set and transmit as a filter the retrieved content provider & service specific service provision characteristics CP&S-SPC to the service provision control device SPCD (when used for the service provision, also together with the user-specific subscription data USD. As explained above, it is not necessary that necessarily the CP&S-SPCs are provided separately for each user (in a user-specific format) because they can be set commonly for all users. However, preferably the CP&S-SPCs are set individually for each user. If set individually for each user, the respective set of CP&S-SPCs for each user may be stored in association with the respective user-specific subscription data USD. If the SPCs are stored on a user-specific basis, the message S31 in FIG. 3 (or step S3 in FIG. 6) may not only comprise the CP&S-ID but also a user identification UID in order to retrieve and set the CP&S-SPCs on a user-specific basis in the filter to be transmitted to and to be used by the service provision control device SPCD.

In FIG. 6 the service provision control device SPCD is part of a gateway GW. As explained above, the service provision control device SPCD is adapted to provide the requested service from the content provider CP to the user station UE in accordance with the transmitted filter including the service provision characteristics SPC1 and/or SPC2 set by the collection controller SPC-CNTL, more specifically by the setting device SET.

In case that the service provision characteristics CP&S-SPC comprise first service provision characteristics SPC1 indicating transmission related provision characteristics and second service provision characteristics SPC2 indicating charging related provision characteristics, the service provision control device SPCD may comprise a transmission control device TCD in which the transmission related characteristics are set as a transmission filter and a charging control device CCD in which the charging related provision characteristics are set as a charging filter, respectively by said setting device SET. Having set the corresponding characteristics as a transmission filter and/or as a charging filter by the setting device SET and having transmitted them respectively to a transmission control device TCD and a charge control device CCD, the service provision control device SPCD takes care that the service from the content provider CP is provided in accordance with the respectively set provision characteristics of the respective filters. Thus, one can say that by the setting of the new service provision characteristics in the service provision control device SPCD as a filter, the service will be provided from the content provider CP to the user equipment UE in a "filtered" manner, the filter being provided by the service provision control device SPCD in accordance with the set characteristics in the TCD and CCD devices.

Thus, in FIG. 6, in response to the server provision request message S2 received from the sending device SD of the user equipment UE, the content provider CP sends in step S3 a content provider & service identification CP&S-ID, possibly together with a user identification UID as explained above, to the service provision characteristics collection controller SPC-CTRL. In step S4, the user station UE sends a transmission characteristics request message to the gateway device GW. The gateway device GW sends in step S5 a transmission characteristics and charging characteristics request message to the service provision characteristics collection controller SPC-CTRL. In step S6, S6', the collection controller SPC-CTRL collects from said user subscription database USD, on the basis of said requested transmission and charging characteristics (obtained in steps S4, S5) and said content provider & service identification CP&S-ID (and possible the user identification UID) first and second service provision characteristics SPC1, SPC2 matching those of said requested transmission characteristics and said charging characteristics. In step S7, the setting device SET sets the collected first service provision characteristics SPCs and the collected second service provision characteristics SPC2 as filters (transmission filter and charging filter) and transmits them to said transmission control device TCD and said charging control device CCD of said service provision control device SPCD of said gateway device GW of said communication system SYS. In step S8, S8', said requested service is provided from the content provider CP to the user station UE through the gateway device GW in accordance with the set first and second service characteristics SPC1, SPC2 in said transmission and charging filters.

The user identification UID, if used in the above process, may comprise one or more of the group consisting of IMSI, IMSIDN, APN and RAT type.

Thus, FIG. 6 shows more concrete details of how the CP&S-SPCs are retrieved, set, transmitted and used during the provision of the service. In particular, the content provider & service identity CP&S-ID to be used by the collection controller SPC-CNTL to find out the correct CP&S-SPC in the subscriber database UDB for the requested service and IP filter information for identification of service data flow for policy control is provided in step S3. Preferably, general service QoS requirements may be included in the step S3.

In step S4, the transmission characteristics request message is provided from the user station UE to the gateway device GW. Thus, the collection controller SPC-CNTL receives through the message S3 the necessary identification of the content provider & service and through step S4, S5 it receives the requested transmission characteristics and charging characteristics request message. Thus, step S4 may be viewed as a bearer request/modification message and step S5 may be viewed as a request message for policy filter settings for the requested bearer.

Figure 2:
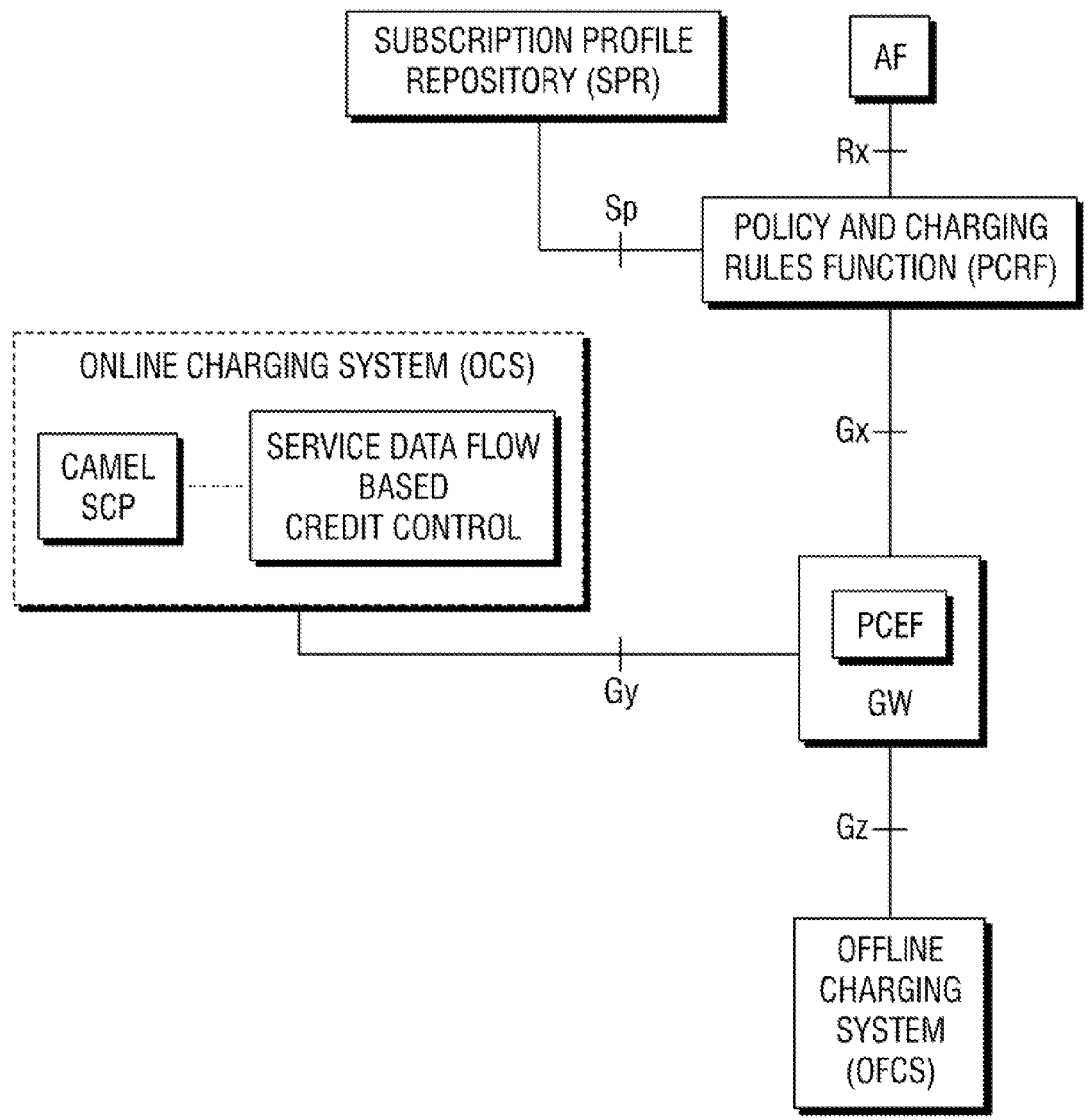
FIG. 2 shows a technical background of existing technology in the 3GPP policy architecture for QoS and charging policy control.

Above, in FIG. 2 a standard prior art implementation of a communication system SYS in accordance with the 3GPP implementation was explained. Hereinafter, an embodiment of the invention in terms of a 3GPP implementation of the system shown in FIG. 6 will be described as a second embodiment with referenced to FIG. 7.

Figure 7:
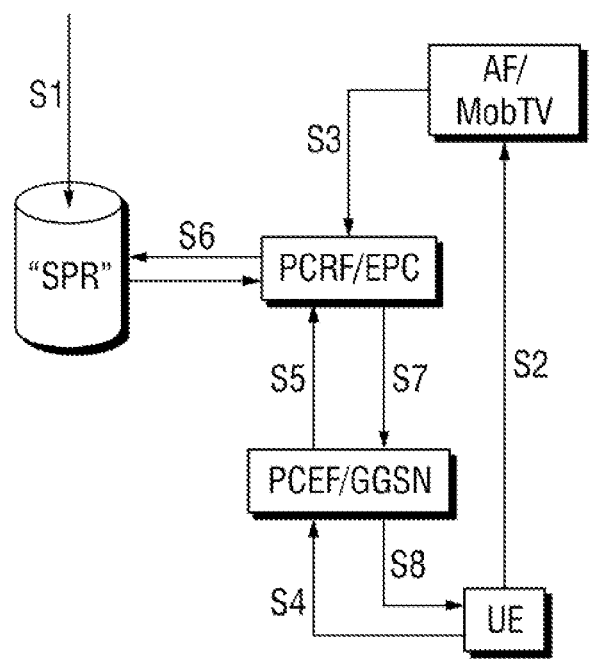
FIG. 7 shows an implementation of the invention in the PCC-3GPP standard.

In FIG. 7, the communication system SYS operates in accordance with the PCC-3GPP standard, wherein the user subscription database UDB is constituted by a Subscription Profile Repository SPR unit. The collection controller SPC-CNTL with the setting device SET and the retrieving device RETR in FIG. 6 is implemented by a Policy and Charging Rules Function PCRF unit. The gateway device GW is constituted by a GPRS general service node GGSN. The service provision control device SPCD with the transmission control device TCD and the charging control device CCD is constituted by a Policy and Charging Enforcement Function PCEF unit.

In FIG. 7, in step S1, a third party provisions to the SPR new policy data, namely the CP&S-SPCs, for example those shown in FIG. 4 and FIG. 5. In step S2, a sending device SD of the user equipment UE requests a service to the application function AF/MobTV, namely to the content provider CP shown in FIG. 6.

In step S3, the content provider AF/MobTV provides—for example through the Rx interface—the CP & service identity CP&S-ID to be used for the PCRF to find out the correct policy data in the SPR for the requested service and IP filter information for identification of service data flow for policy control. Preferably, quality of service QoS requirements may be included.

In step S4, already shown in FIG. 6, the user equipment UE requests a PDP context with a certain QoS, i.e. it requests certain transmission characteristics QoS at the PCEF/GGSN.

In step S5, the PCEF/GGSN checks if the quality of service QoS requested falls within predetermined levels and asks about payment methods (user versus third party, volume base, event base, etc.).

In step S6, the PCRF/EPC requests specific policy data to construct the correct charging filter and checks the maximum bandwidth.

In step S7, the PCRF/EPC installs the correct QoS/charging rules into the PCEF/GGSN.

In step S8, the PDP context is accepted and the service is provided.

The specific example in FIG. 7 shows a specific implementation of the invention in terms of the 3GPP standard. Thus, the operator gets an additional and attractive business role towards the third party device and content providers via the extended user database SPR.

In FIG. 7, although not shown with detail, the PCEF unit may cooperate with an Online Charging System OCS and an Offline Charging System OFCS through a respective interface Gy, Gz, as shown in principle in FIG. 2.

Above, with reference to FIG. 2, it has already been described that it is possible that the reference point Sp allows the SPR to notify the PCRF when the subscription information/data has been changed if the PCRF has requested such notifications.

Also in another embodiment of the invention, it is possible that the user subscription database UDB provides a content provider & service specific characteristics update message UP to the collection controller SPC-CNTL as indicated with the dotted lines in FIG. 6. Thus, whenever at third party, for example the content provider CP', changes the contents of the subscriber database UDB, an update message UP can be provided to the collection controller SPC-CNTL which subsequently sets the corresponding transmission characteristics and charging related characteristics in the devices TCD, CCD through the filter setting and transmission.

The provision of such an update message UP whenever new characteristics are set in the user database UDB allows a flexible and online setting and use of the characteristics in the service provision control device SPCD.

Although above an implementation in FIG. 7 was explained with reference to the mobile 3GPP (TS 23.203), 3GPP2 etc. standard, also other implementations for fixed standard, like the TISPAN standard, IS282 003, can be made in a similar fashion. For example, in another embodiment of the TISPAN standard, the SPC-CNTL controller (in FIG. 6) may be incorporated into the logical function (s) SPDF (Service Policy Decision Function) and/or A-RACF (Access-Resource and Admission Control Function).

Considering FIG. 6 (but also FIG. 7), the invention addresses UE triggered modification of transport bearer attributes only. That is, the subscriber provision control device SPCD will perform a modification of bearer attributes when the service is provided. However no modification of other attributes is necessary.

It may, however, also be noted that the bearer attribute modification may be achieved through triggers from the network side, as shown in a further embodiment in FIG. 8 below.

Figure 8:
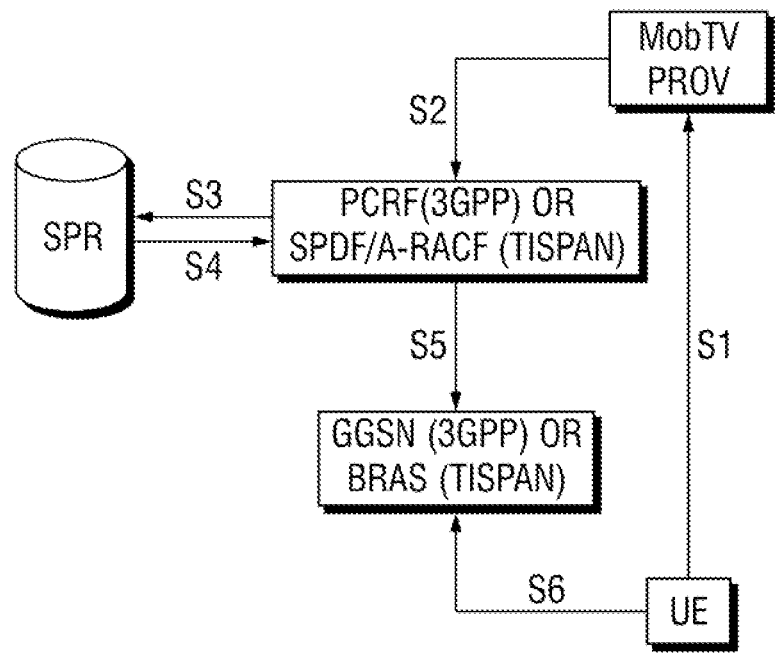
FIG. 8 shows another implementation of the invention in the PCC-3GPP standard with a network triggered change of transport bearer characteristics.

FIG. 8 shows a network triggered change of the transport bearer characteristics in another embodiment of the invention in connection with the framework FIG. 3. In FIG. 8, in contrast to FIG. 7, the important change is that the gateway GWSN (3GPP) or BRAS (TISPAN) changes the transport characteristics on the bearer (boldline). In addition generated charging records are put on the content provider's identity instead of the UE's identity.

Thus, in FIG. 8, in step S1 the UE requests a service from the content provider MobTV, just as the message S2 in FIG. 7. In step S2 in FIG. 8, the content provider MobTV sends information to the operator via the PCRF or SPDF/A-RACF. Included are the CP & S-ID (the content provider & service 6 identification), and the UE identity (user identification UID), e.g. an UE IP address, a MSISDN IMSI, or calling line identity. In step S3 in FIG. 8, the PCRF or the SPDF/A-RACF checks in the SPR about applicable policies (service provision characteristics). In step S4 in FIG. 8, the SPR returns applicable policies, i.e. the applicable service provision characteristics, depending on the content provider & service identification CP&S-ID (and possibly the user identification UID).

In step S5 in FIG. 8, the PCRF or SPDF/A-RACF constructs filters, (e.g. Char or QoS to be set in the gateway device (e.g. GGSN-BRAS)). Then, in step S6, when the service is provided by the content provider MobTV, the gateway GGSN changes transport characteristics on the bearer (boldline). In addition generated charging records are put on the content provider's identity instead of the UE's identity, i.e. the content provider is charged rather than the user of the user equipment UE.

Above, in the description of FIG. 3, FIG. 6, FIG. 7 and FIG. 8, the fetching of policy data (content provider and service specific service provision characteristics CP&S-SPCs from the user subscriber database UDB) from the SPR uses the CP&S identity of the content provider CP. However, in accordance with another embodiment the UE identity (user identification UID) may be used together with the CP&S identities. The above is also true when the content provider interfaces the TRANS/SPC-CNTL system. As UE identity one could for example use the IP address, MSISDN, IMSI or calling line identity of the user equipment UE (line identity=physical connection identity of the user equipment used in fixed networks).

Above, in connection with FIG. 1b, and in connection with FIG. 3 and FIG. 6, it was explained that eventually the user of the user equipment UE is charged if the UE identity (the user subscription identity UED) is used by the gateway GW) the charging control device CCD) for generating the charging records. However, charging records, in accordance with another embodiment of the invention, may be generated by the charging control device CCD in association with the content provider & service identities (e.g. 8759-570) instead of the user identity UID. Thus, eventually, the user of the user equipment UE is not charged at all, but the content provider CP is charged with the generated charging record which was the original aims of the invention.

Figure 9:
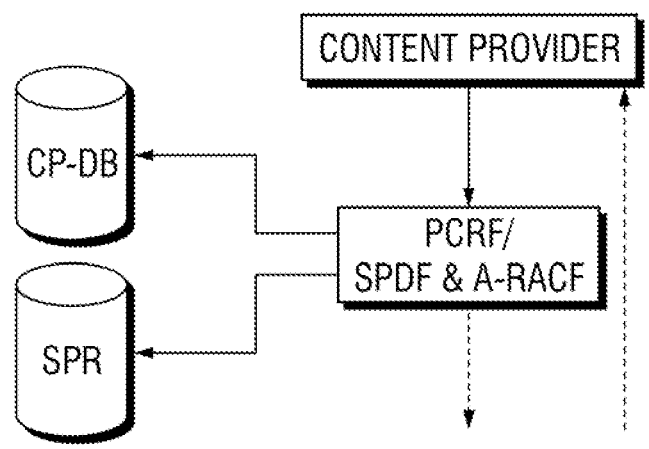
FIG. 9 shows another embodiment of the invention in which the user subscription database SPR and the content provider & service specific database CD-DB are separate from each other.

Above, in the description of FIG. 3, FIG. 6 and FIG. 7, FIG. 8, the user subscription database UDB has been described as a single database, for example the user subscription database in FIG. 3 and FIG. 6, and the SPR in FIG. 7 and FIG. 8. However, in accordance with another embodiment of the invention the database SPR may be split into two, namely a content provider database CP-DB and the SPR, as shown in FIG. 9. The CP-DB is provisioned by the content provider CP and the SPR is the subscriber profile repository which is provisioned by the operator in accordance with the subscription agreement. Therefore, the content provider CP provides to the PCRF/SPDF/A-RACF (TISPAN) the content provider & service identification CP&S-ID together with the user identification UID and the two databases CP-DB and SPR will be separately addressed.

Above, especially in the embodiment shown in FIG. 6, it was described that the content provider CP (or CP') may set specific policies and rules (service provision characteristics SPC) which are content provider & service specific (content provider & service dependent). Such service provision characteristics SPC may include, in accordance with the above description, transmission control characteristics and charging characteristics, both being content provider & service specific. In addition, the subscription data being user-specific may be used also for setting transmission characteristics and/or charging characteristics in the respective devices TCD, CCD. For example, there already may be an agreement between the user and the operator that a certain bandwidth (quality of service) should be used at a specific charging rate. In addition, after setting the retrieved content provider & service specific service provision characteristics CP&S-SPC in the service provision control device SPCD through the transmission of the newly set filter, there may also be again a setting of the transmission characteristics, i.e. the quality of service in connection with a specific charging rate as provisioned by the content provider. Obviously, this could result in a conflict situation and in the invention the CP's provisioned policy (characteristics) overrides the provision policy of the subscriber in case of conflicting policies (service provision characteristics), in accordance with yet another embodiment of the invention.

In accordance with the invention a content provider (third party) can influence the provision of his service by means of retrieving and setting service provision characteristics relating to the content provider or service in the service provision control device SPCD. The provision of the service will then be made by the service provision control device SPCD in accordance with the changed/set transmission characteristics and/or charging characteristics. Such a service provision concept may be used in any communication system SYS and is particularly useful in 3GPP implementations. The content provider CP may be one or more of a mobile TV provider, a message server, a general server of a client/server system, a gaming provider or a gaming server without being limited thereto.

Furthermore, the user equipment UE, i.e. the user station, may be a personal computer, a laptop computer, a mobile telephone, a PDA, or a gaming device without being limited thereto.

The invention also relates to a computer-readable storage medium having recorded thereon a program for carrying out one or more of the steps as described above and disclosed in the claims and/or drawings.

Furthermore, it should be noted that the invention comprises embodiments which are formed from steps/features which have been separately described and shown in the description, the claims and the drawings. Therefore, the present invention may comprise further modifications and variations which are obvious to the skilled person on the basis of the above teaching.

Furthermore, reference numerals in the claims only serve clarification purposes and do not limit the scope of these claims.

The invention claimed is:

1. A method in a communication system for providing services from a content provider to one or more user stations dependent on service provision characteristics in a user subscription database, said service provision characteristics comprise at least content provider and service specific provision characteristics, comprising the following steps:
   a) sending, from a user station, a service request message to said content provider;
   b) retrieving, by a retrieving device of a collection controller, from said user database content provider and service specific provision characteristics dependent on a content provider and service identification provided by said content provider in response to said service request message, wherein said service provision characteristics comprise first service provision characteristics indicating transmission related provision characteristics and second service provision characteristics indicating charging related provision characteristics;
   c) setting, by a setting device of said collection controller, a service provision filter on the basis of said retrieved content provider and service specific provision characteristics and transmitting said service provision filter to a service provision control device of said communication system; and
   d) providing said requested service from said content provider to said user station through said service provision control device in accordance with said content provider and service specific service provision characteristics set in said service provision filter;
   wherein said first service provision characteristics indicating transmission related provision characteristics include a Quality of Service parameter and said second service provision characteristics indicating charging related provision characteristics include a Subscriber Validity Group, Payment Conditions, Validity Period and Geographical Area.

2. A method according to claim 1, wherein step a) is preceded by a step a0) in which a service/content provider sets said content provider and service specific characteristics in said user subscription database.

3. A method according to claim 2, wherein whenever a third party changes said content provider and service specific characteristics in said user subscription database, a content provider and service specific characteristics update message is provided to said collection controller.

4. A method according to claim 1, wherein said user subscription database further stores user specific subscription data for each user, wherein
   said step b) further comprises the retrieving of user specific subscription data from said user database dependent on a user identification;
   said step c) further comprises the setting of said user specific subscription data in said service provision filter and the transmitting of said service provision filter to said service provision control device of said communication system; and
   said step d) further comprises the providing of said requested service from said content provider to said user station through said service provision control device in accordance with said set content provider and service specific provision characteristics as well as said user specific subscription data in said service provision filter.

5. A method according to claim 1, wherein said service provision control device is part of a gateway device, and said retrieving step b) comprises the following steps:
- sending said content provider and service identification from said content provider to said service provision characteristics collection controller;
- sending a transmission characteristics request message to said gateway device;
- sending a transmission characteristics and charging characteristics request message from said gateway device to said service provision characteristics collection controller;
- said collection controller collecting from said user subscription database, on the basis of said requested transmission and charging characteristics and said content provider and service identification, first and second service provision characteristics matching those of said requested transmission characteristics and said charging characteristics;
- and said setting step c) comprises the setting of the collected first service provision characteristics second service provision characteristics as a transmission filter and as a charging filter and the transmission of said transmission filter to a transmission control device and said charging filter to a charging control device of said gateway device of said communication system; and
- said providing step comprises the providing of said requested service from said content provider to said user station through said gateway device in accordance with said first and second service provision characteristics set in said transmission filter and charging filter.

6. A method according to claim 5, wherein said communication system operates in accordance with the PCC-3GPP Standard, wherein:
- said user subscription database is constituted by a subscription Profile Repository;
- said collection controller including said retrieving device and said setting device is constituted by a Policy and Charging Rules Function unit; said gateway unit is constituted by a GPRS General Service Node; and said transmission control device and said charging control device are constituted by a Policy and Charging Enforcement unit in said gateway unit.

7. A method according to claim 6, wherein said Policy and Charging Enforcement unit cooperates with a Online Charging System and an Offline Charging System through a respective interface.

8. A method according to claim 1, wherein said user identification comprises one or more of the group consisting of: International Mobile Subscriber Identity (IMSI), Mobile Subscriber Integrated Services Digital Network Number (MSISDN), Access Point Name (APN), and Remote Agent Token (RAT) type.

9. A controller of a communication system which includes a user subscription database in which are stored at least service provision characteristics, said service provision characteristics comprise at least content provider and service specific provision characteristics, one or more user stations and a service provision control device for providing services from said content provider to said one or more user stations dependent on said service provision characteristics, comprising:
- a) a retrieving device adapted to retrieve from said user database content provider and service specific provision characteristics dependent on a content provider and service identification provided by said content provider, wherein said service provision characteristics comprise first service provision characteristics indicating transmission related provision characteristics and second service provision characteristics indicating charging related provision characteristics; and
- b) a setting device adapted to set a service provision filter on the basis of said content provider and service specific provision characteristics; and
- c) said setting device being also adapted to transmit said set service provision filter to said service provision control device which controls the service provision from said content provider to said user station dependent on said service provision filter;
- wherein said first service provision characteristics indicating transmission related provision characteristics include a Quality of Service parameter and said second service provision characteristics indicating charging related provision characteristics include a Subscriber Validity Group, Payment Conditions, Validity Period and Geographical Area.

10. A controller according to claim 9, wherein said content provider and service specific provision characteristics are charging related service provision characteristics and said service provision filter is a charging filter.

11. A controller according to claim 10, wherein service provision control device is part of a gateway device wherein said user station, said collection controller, said setting device and said service provision control device execute the following procedure:
- said content provider sending said content provider and service identification to said service provision characteristics collection controller;
- said user station sending a transmission characteristics request message to said gateway device;
- said gateway device sending a transmission characteristics and charging characteristics request message to said service provision characteristics collection controller;
- said collection controller collecting from said user subscription database, on the basis of said requested transmission and charging characteristics and said content provider and service identification, first and second service provision characteristics matching those of said requested transmission characteristics and said charging characteristics; and
- said setting device setting as a transmission filter the collected first service provision characteristics and as a charging filter said collected second service provision characteristics and transmitting said transmission filter to a transmission control device and said charging filter as to a charging control device of said service provision control device of said gateway device of said communication system; and
- said service provision control device providing said requested service from said content provider to said user station through said gateway device in accordance with said set first and second service provision characteristics set in said transmission and charging filters.

12. A controller according to claim 9, wherein said retrieving device is adapted to retrieve or to receive said content provider and service identification from said content provider.

13. A controller according to claim 12, wherein said retrieving device is adapted to retrieve said content provider and service identification from said content provider through a receiver (Rx) interface.

14. A controller according to claim 9, wherein said user subscription database further stores user specific subscription data for each user, wherein said retrieving device is further adapted for retrieving of user specific subscription data from said user subscription database dependent on a user identification;

said setting device is further adapted to set said user specific subscription data in said service provision filter; and wherein said service provision control device is adapted to provide said requested service from said content provider to said user station through said service provision control device in accordance with said set content provider and service specific provision characteristics as well as said user specific subscription data in said set and transmitted service provision filter.

15. A controller according to claim 14, wherein said user identification comprises one or more of the group consisting of: International Mobile Subscriber Identity (IMSI), Mobile Subscriber Integrated Services Digital Network Number (MSISDN), Access Point Name (APN), and Remote Agent Token (RAT) type.

* * * * *

UNITED STATES PATENT AND TRADEMARK OFFICE
CERTIFICATE OF CORRECTION

PATENT NO. : 9,245,285 B2  
APPLICATION NO. : 12/306836  
DATED : January 26, 2016  
INVENTOR(S) : Petersson et al.

Page 1 of 1

It is certified that error appears in the above-identified patent and that said Letters Patent is hereby corrected as shown below:

Specification

In Column 7, Line 5, delete "(OP)" and insert -- (CP) --, therefor.

In Column 13, Line 1, delete ""8759"," and insert -- "8759" --, therefor.

Signed and Sealed this
Twenty-sixth Day of April, 2016

Michelle K. Lee
*Director of the United States Patent and Trademark Office*